US012615674B2

(12) United States Patent
Kalke et al.

(10) Patent No.: US 12,615,674 B2
(45) Date of Patent: Apr. 28, 2026

(54) METHOD AND SYSTEM FOR ACCELERATING CONNECTIONS TO A NETWORK

(71) Applicant: AT&T Intellectual Property I, L.P., Atlanta, GA (US)

(72) Inventors: Catherine Kalke, Seattle, WA (US); Yupeng Jia, Pasadena, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 369 days.

(21) Appl. No.: 18/179,687

(22) Filed: Mar. 7, 2023

(65) Prior Publication Data

US 2024/0163933 A1     May 16, 2024

Related U.S. Application Data

(60) Provisional application No. 63/425,121, filed on Nov. 14, 2022.

(51) Int. Cl.
| | |
|---|---|
| *H04W 76/10* | (2018.01) |
| *H04W 48/16* | (2009.01) |
| *H04W 64/00* | (2009.01) |

(52) U.S. Cl.
CPC .......... *H04W 76/10* (2018.02); *H04W 48/16* (2013.01); *H04W 64/00* (2013.01)

(58) Field of Classification Search
CPC .... G01C 21/3841; H04L 67/51; H04W 76/10; H04W 48/16; H04W 64/00
See application file for complete search history.

(56) References Cited

U.S. PATENT DOCUMENTS

2021/0385755 A1* 12/2021 Zavesky ............. H04W 52/283

* cited by examiner

*Primary Examiner* — Diane D Mizrahi
(74) *Attorney, Agent, or Firm* — Guntin & Gust, PLC; Daniel Williams

(57) ABSTRACT

Aspects of the subject disclosure may include, for example, determining, by an end user device, a destination location for the end user device; determining, by the end user device, frequency band data for the destination location according to connection data stored in a memory of the end user device; responsive to or after exiting an airplane mode of the end user device, scanning, by the end user device, bands of a cellular network providing coverage to the destination location, where the scanning is according to the frequency band data; and attaching, by the end user device, to a cell of the cellular network based on the scanning of the bands. Other embodiments are disclosed.

20 Claims, 9 Drawing Sheets

200

260

DEVICE INPUTS

2810

CHIPSET AI FUNCTIONALITY

2820

CELLULAR CONNECTION

METHOD AND SYSTEM FOR ACCELERATING CONNECTIONS TO A NETWORK

CROSS-REFERENCE TO RELATED APPLICATION(S)

The present application claims the benefit of priority to U.S. Provisional Application No. 63/425,121, filed Nov. 14, 2022. All sections of the aforementioned application(s) and/or patent(s) are incorporated herein by reference in their entirety.

FIELD OF THE DISCLOSURE

The subject disclosure relates to a method and system for accelerating connections to a network.

BACKGROUND

Latency is experienced by end user devices when connecting to a cellular network serving a destination airport. The end user device must scan for the uplink and downlink frequency numbers in order to attach to a cell in the cellular network serving the destination airport. This latency impacts the user experience in the operation of the end user device and impacts the user's perception of an "always on" connection.

BRIEF DESCRIPTION OF THE DRAWINGS

Reference will now be made to the accompanying drawings, which are not necessarily drawn to scale, and wherein:

FIG. 2C depicts an illustrative embodiment of a method in accordance with various aspects described herein.

DETAILED DESCRIPTION

Figure 1:
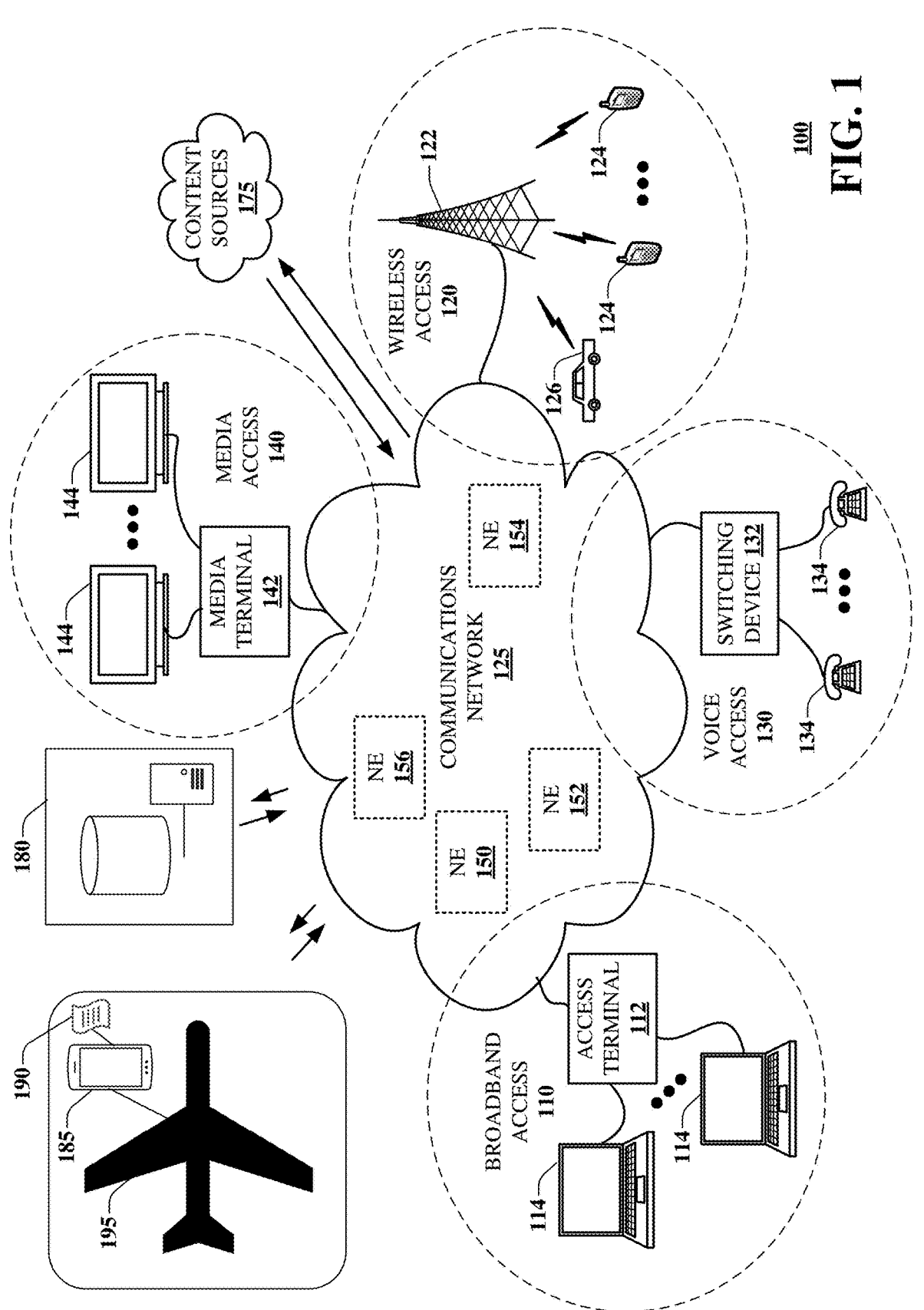
FIG. 1 is a block diagram illustrating an exemplary, non-limiting embodiment of a communications network in accordance with various aspects described herein.

The subject disclosure describes, among other things, illustrative embodiments for supporting a mechanism (e.g., components and functionality) which can use an Artificial Intelligence (AI) chipset database and/or machine learning to establish an accelerated device connection to a cellular network serving a destination location, such as a destination airport. In one or more embodiments, a machine learning mechanism can be used to update a master database used by an AI engine in an end user device to identify the destination location (e.g., airport) and map to the frequency numbers for the cellular network. In one or more embodiments, real-time updates can be provided for the destination location wireless network information (including for a Wi-Fi® access point and/or cellular network) based on machine learning of historical traveler(s)'s device(s) connection information.

In one or more embodiments, the end user device (e.g., the AI chipset) can obtain MCC/MNC (Mobile Country Code/Mobile Network Code) from MIB (Master Information Block) block in a signaling channel(s); E-NRARFCN UL/DL (Evolved/New Radio Absolute Radio Frequency Channel Number uplink/downlink) numbers from SIB1 (System Information Block Type 1) block in signaling channel(s) and/or airport ID Flag. This information can be utilized for determining or predicting a destination location and/or facilitating targeted scanning of bands and RSSI data at the destination by the end user device.

In one or more embodiments, the end user perceives an "always connected to 5G" experience. In one or more embodiments, a chipset manufacturer can facilitate and/or monetize use of an AI engine and machine learning on the location destination and arrival time by providing this data through an API (application programming interface) to a travel application installed on the end user device. Other embodiments are described in the subject disclosure.

One or more aspects of the subject disclosure include an end user device, comprising: a processing system including a processor; and a memory that stores executable instructions that, when executed by the processing system, facilitate performance of operations. The operations can include entering an offline mode that prevents cellular communications. The operations can include providing, via an antenna of a vehicle, a short-range communication service to a user while in the offline mode. The operations can include determining a destination location for the vehicle. The operations can include determining frequency band data for the destination location according to connection data stored in the memory. The operations can include exiting the offline mode. The operations can include, responsive to the exiting the offline mode, scanning bands of a cellular network providing coverage to the destination location, where the scanning is according to the frequency band data. The operations can include attaching to a cell of the cellular network based on the scanning of the bands.

One or more aspects of the subject disclosure include a non-transitory machine-readable medium, comprising executable instructions that, when executed by a processing system including a processor of an end user device, facilitate performance of operations. The operations can include obtaining frequency band data and Wi-Fi® Access Point Name (APN) data for a destination location where the end user device has arrived. The operations can include revising connection data stored in a memory of the end user device according to the frequency band data and the Wi-Fi® APN data. The operations can include providing the frequency band data and the Wi-Fi® APN data to a database that is accessible to other end user devices not associated with the end user device.

One or more aspects of the subject disclosure include a method comprising receiving, from a first end user device by a processing system including a processor, frequency band data for a destination location where the first end user device has arrived. The method can include updating, by the processing, system, connection data stored in a database accessible to the processing system according to the frequency band data. The method can include providing, by the processing system via a short-range communication service to a second end user device, the frequency band data for the destination location, where the short-range communication service is provided via an antenna of a vehicle while the second end user device is in an offline mode, and where the vehicle is travelling to the destination location. The providing of the frequency band data can enable the second end user device to attach to a cell of a cellular network at the destination location based on scanning of bands according to the frequency band data.

Referring now to FIG. 1, a block diagram is shown illustrating an example, non-limiting embodiment of a system 100 in accordance with various aspects described herein. System 100 can include end user device(s) 185 (only one of which is shown), which can be travelling with a user to a destination location, such as a user on an airplane 195. Other types of end user devices 185, vehicles 195, and destination locations are contemplated by the embodiments.

The end user device 185, which includes a processing system including a processor; and a memory that stores executable instructions that, when executed by the processing system, facilitate performance of operations, can enter an offline mode (e.g., an airplane mode) that prevents cellular communications or other communications that are not permitted according to rules or regulations for travel by the vehicle 195. However, the vehicle 195 can offer a short-range communication service (e.g., in-flight Wi-Fi®) to a user while in the offline mode, such as through use of equipment and an antenna of the vehicle.

In one embodiment, the end user device 185 can determine the destination location for the vehicle, which can be done through various techniques including analyzing beacon signals of the short-range communication service (e.g., whether or not the end user device has connected to the vehicle's short-range communication service). Other techniques for determining the destination location can include queries sent by the end user device 185 via the vehicle's short-range communication service, notifications received via the vehicle's short-range communication service, analysis of communications occurring via the vehicle's short-range communication service, analysis of location information that is available to the end user device, such as over the vehicle's short-range communication service, analysis of the user's electronic calendar, and so forth.

In one embodiment, a machine learning model 190 (which can employ various types of artificial intelligence/machine learning) can be executed or otherwise employed by the end user device 185 to identify the destination location, such as parsing collected data including fields in beacon frames sent out over the vehicle's short-range communication service. As an example, the determination of the destination location can be made by directly extracting the destination from the analyzed data and/or deriving the destination location from the parsed data where the parsed data includes information that is known or predicted to be associated with particular locations. Once the destination location is determined or predicted, the end user device 185 can search its own memory (e.g., stored connection data for various locations) to determine connection information for the particular location, such as frequency band data (e.g., uplink and downlink) for the destination location stored in the memory. In one or more embodiments, the various determinations described herein can be made by various devices, including end user devices and network devices, which may or may not rely on machine learning models.

In one embodiment, the end user device 185 can exit an offline/airplane mode (e.g., manually and/or automatically), which can trigger (automatically or with user approval such as by providing a selectable notification at the end user device display) performing connection procedures for a cellular network providing coverage at the destination location. For instance, the end user device 185 can perform targeted scanning of bands (e.g., scanning less than all of the bands, scanning in a particular order, and so forth) of the cellular network according to the frequency band data, and can select and attach to a particular cell of the cellular network based on the scanning of the bands and/or based on other factors and procedures including obtaining and analyzing RSSI (received signal strength indicator) data for different available cells.

In one embodiment, the end user device 185 can obtain, via the short-range communication service of the vehicle 195 and from the database 180, updated connection information, such as updated frequency band data for one or more locations. For instance, while the vehicle 195 is in transit, connection information for the destination location may be changed (e.g., by the local service provider) and the end user device 185 can be made aware of this change through access to the database 180.

In one embodiment, the end user device 185 can, after or responsive to exiting the offline/airplane mode, scan RSSI for a group of cells according to the frequency band data; and can select the cell of the cellular network for attachment based on the scanning of the RSSI.

For example, system 100 can facilitate in whole or in part determining, by an end user device, a destination location for the end user device, which can be done in a number of different ways including analyzing beacon signals of a short-range communication service (e.g., in-flight Wi-Fi®) available to the end user device, analyzing location data available to the end user device, and so forth; determining, by the end user device, frequency band data (e.g., uplink and downlink) for the destination location according to connection data stored in a memory of the end user device (and mapped or indexed to locations), where the connection data can be managed or maintained in a number of different ways including by updating from other end user devices that are arriving at or operating in other locations, updating from a central or distributed database, and so forth; responsive to or after exiting an offline/airplane mode of the end user device, scanning, by the end user device, bands of a cellular network providing coverage to the destination location, where the scanning can be performed in a targeted fashion according to the frequency band data which can be performed faster than a general uplink and downlink scan of bands; and attaching, by the end user device, to a particular cell of the cellular network based on the scanning of the bands and/or other functions such as analyzing RSSI measurements.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX (Worldwide Interoperability for Microwave Access) network, Ultra-Wideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
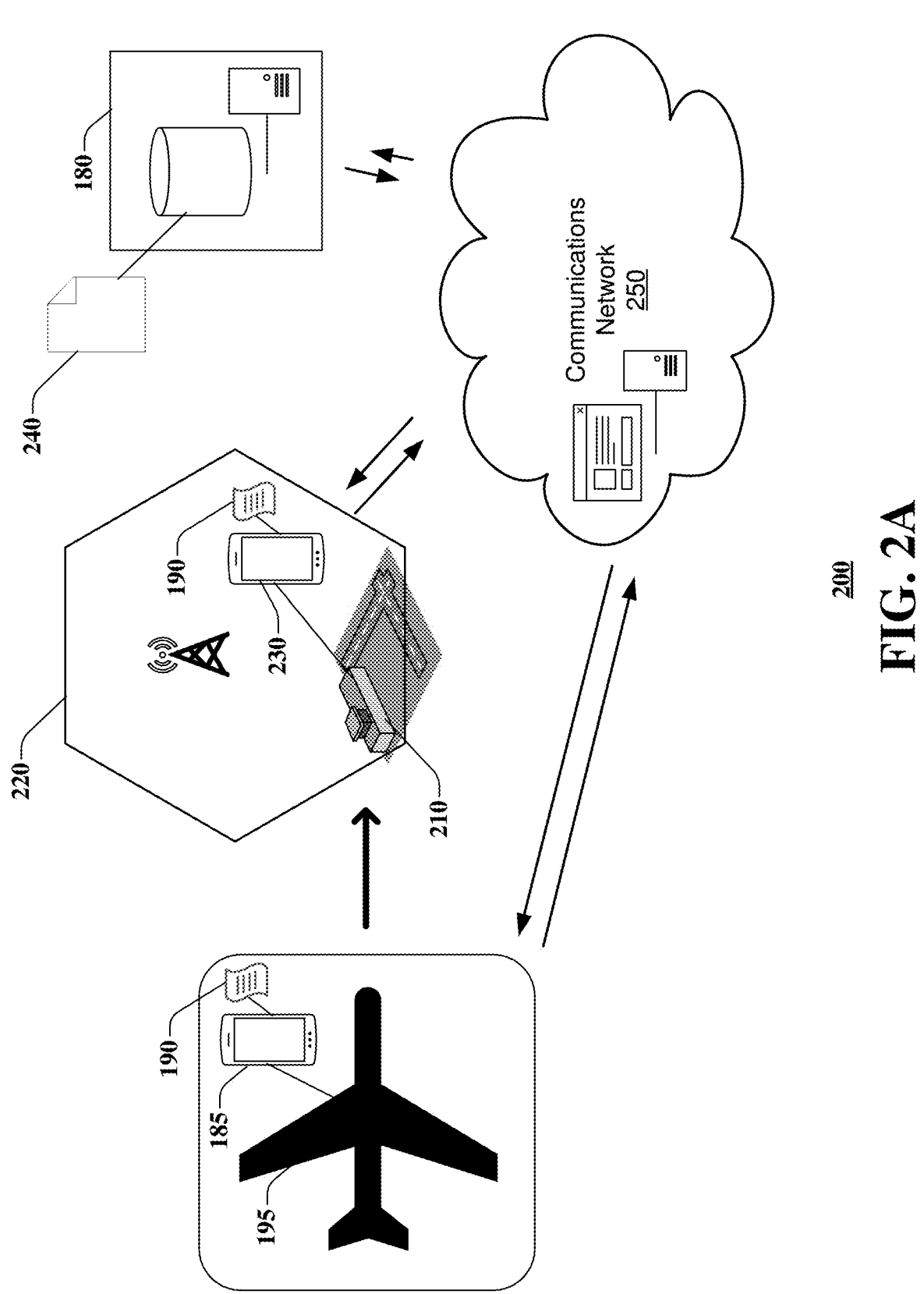
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. System 200 can provide for an efficient and accelerated connection for end user devices 185 arriving at particular locations, which can include airports 210, as well as other locations such as leaving a university campus or a factory that had private networks. In one embodiment, AI/ML (artificial intelligence/machine learning) functionality can be provided in the end user devices 185 in the chipset to accelerate the device connection time to the network, such as a cellular network.

As an example, an end user device 185 can enter airplane mode and can connect to in-flight Wi-Fi® once the flight is airborne. The AI engine in the chipset can parse the name of the destination airport 210 from the beacon signal (e.g., in-flight Wi-Fi® access point, airplane carrier equipment, Bluetooth, NFC, etc.) The AI engine in the chipset can perform a search query in the resident database of the end user device 185 utilizing the name of the destination airport 210, which returns to the chipset mapped frequency numbers. The end user device 185 can exit or be forced out of airplane mode as the flight lands, such as on the tarmac of the destination airport 210. The end user device chipset can then perform a targeted search using the mapped frequency numbers to quickly determine 5G/6G/NG/NTN RSSI (where NTN is Non-Terrestrial Networks such as satellites) and can perform an attach to the primary cell 220. In one embodiment, the end user device chipset can also perform a targeted search for the cell 220. The end user device 185 can be quickly connected to the cellular network serving the destination airport 210. In one embodiment, the end user device chipset can also connect the end user device 185 to a Wi-Fi® AP at the destination airport 210, such as utilizing Wi-Fi® APN/credentials stored in its memory that are mapped to various locations including the particular destination location. In one embodiment, the end user device chipset can confirm whether a data connection is persistent. If there is no data connection, then the end user device chipset can automatically perform a troubleshooting sequence. In this example, the user perceives a seamless "always on" connection since there is no interruption or delay in the use of the end user device 185. In one or more embodiments, the chipset of the end user device 185 can perform the various functions described herein with or without employing an AI engine.

As another example, system 200 facilitates updating AI engines on end user devices 185, 230 and master/global database(s) 180 for destination locations such as airports 210. The database 180 is described as a master/global, however, the database can be centralized or distributed. For instance, a machine learning mechanism can be employed to update the master database 180 used by the AI engine to identify the destination airport and map to the frequency numbers (or other connection data) for the cellular network (or other type of network). In one embodiment, the AI engine in the chipset of the end user device updates the resident device database with the 1) latest known mapped frequency numbers for the destination, and 2) Wi-Fi® Access Point name for the destination (e.g., airport 210). The AI engine in the chipset transfers these learnings to the master destination airport database 180, which can be in the cloud. The AI engine in the chipset can automatically update active on-air frequency band numbers and signal strength in destinations (e.g., airports) for different device models. The AI engine in the chipset can automatically propagate the updated master destination database or a portion thereof to all cellular devices connected to a cellular network. In one embodiment, this propagation can be performed after the device registers to the cellular network and can be transparent to the device user. In one embodiment, the propagation can keep the master destination database current on all cellular devices that have the resident AI engine or equivalent functionality in the chipset. This example is described with respect to airplanes and airports, however, the vehicles can be any type (e.g. cruise ships) and the destination locations can be any type (e.g., sea ports). This example can also apply to embodiments, which may or may not include a vehicle, such as an end user device operating in an isolated room of a building that only allows use of its own private network, where the user walks out of the room and connects with a cellular network in a seamless fashion according to the functionality described herein.

In one embodiment, system 200 is applicable where the end user device 185 does not use the short-range communication service of the vehicle or where the vehicle does not offer a short range-communication service. In this example, the end user device 185 can determine or predict its destination location (e.g., by analyzing beacon signals without utilizing the short-range service or by other location prediction procedures described herein) and upon arrival can utilize previously stored connection information, such as where the connection data on the end user device was updated via a cellular network at a previous location prior to the user boarding the vehicle.

System 200 can include end user devices 185 (only one of which is shown), which can be travelling with a user to a particular destination location 210. In this example, the end user device 185 is being utilized by a user on an airplane 195 that is travelling to the airport 210. Other types of end user devices 185, vehicles 195, and destination locations 210 are contemplated by the embodiments. Communication services can be provided in system 200 utilizing network 250.

The end user device 185 can enter an offline mode (e.g., an airplane mode) that prevents cellular communications or otherwise limits communications where the vehicle 195 offers a short-range communication service (e.g., in-flight Wi-Fi®) while in the airplane mode. The end user device 185 can determine the destination location 210 for the vehicle through various techniques including analyzing beacon signals of the short-range communication service, sending queries via the vehicle's short-range communication service, receiving notifications via the vehicle's short-range communication service, analyzing user communications via the vehicle's short-range communication service, analyzing location information available to the end user device, analyzing the user's electronic calendar, querying the user (e.g., a pop-up message on a display) and receiving user input indicating the destination location, and so forth.

In one embodiment, AI/ML can be applied such as through a machine learning model 190 employed by the end user device 185 to facilitate the methodology described herein including identifying the destination location 210 (e.g., parsing collected data including fields in beacon frames sent out over the vehicle's short-range communication service). As an example, the determination of the destination location 210 can be a direct extraction from analyzed data and/or a derivation such as where the parsed data is known or predicted to be associated with particular locations. Once the destination location 210 is determined or predicted, the end user device 185 can search its own memory to determine connection information mapped to the particular location.

In one embodiment, the end user device 185 can manually and/or automatically exit the airplane mode resulting in connection procedures being performed such as targeted scanning of bands of the cellular network by the end user device according to uplink and/or downlink frequency band data, and the end user device can then attach to a cell 220 of the cellular network based on the scanning of the bands and/or based on other factors and procedures including RSSI data.

In one embodiment, the end user device 185 can obtain, such as during the short-range communication service of the vehicle 195, updated connection information for one or more locations (which can include location 210). This updated connection information can be provided through access to the database 180.

In one embodiment, the end user device 185 can, after or responsive to exiting the offline/airplane mode, scan RSSI for a group of cells (including cell 220) according to the frequency band data; and can select the cell of the cellular network for attachment based on a preferred or sufficient RSSI.

In one embodiment, the frequency band data comprises Absolute Radio Frequency Channel Number for downlink and uplink. In one embodiment, the end user device 185 can determine Wi-Fi® APN and credentials for the destination location 210 according to the connection data stored in its memory. In one embodiment, the end user device 185 can, after or responsive to exiting the airplane mode, connect to an access point of a Wi-Fi® network based on the Wi-Fi® APN and credentials for the destination location 210.

In one embodiment, the end user device 185 can determine whether a data connection is persistent; and, responsive to determining that the data connection is not persistent, perform a troubleshooting sequence for the data connection (e.g., ping testing, trace routing, or other techniques). In one embodiment, other end user device(s) 230 (only one of which is shown) can obtain updated connection information (e.g., frequency band data, Wi-Fi® APN data, and so forth) for the destination location 210. This can be done in a number of different ways including when the end user device 230 arrives at the destination location 210 and attempts to register with the cellular network or otherwise attempts to connect with the cellular network (or other networks), which can include a general scanning of uplink and downlink bands. Continuing with this example, the end user device 230 can provide the updated connection information (e.g., frequency band data and/or Wi-Fi® APN data) to the database 180 so that the database maintains up-to-date connection information 240. This example is described with respect to one end user device and one location, however, the database 180 can receive connection information from numerous end user devices for numerous locations.

In one embodiment, the vehicle's short-range communication service can be Wi-Fi®, Bluetooth, Zigbee, Z-Wave and/or other protocols including future protocols. In one embodiment, the determination of the destination location and/or the determining the frequency band data (and/or Wi-Fi® APN and/or credentials) can occur after the end user device has entered the offline mode (e.g., airplane mode) that prevents or otherwise limits particular RF communications by the end user device, such as preventing cellular communications. In one or more embodiments, the offline mode can be a limit on RF communications, such that an end user device is limited to short-range communications (e.g., in-flight Wi-Fi® services) through equipment of the vehicle (e.g., antenna, server, etc.) and is unable to engage in other direct wireless communications (e.g., cellular or satellite communications). In one or more embodiments, the end user device can switch out of or otherwise exit offline/airplane mode. This can be done manually (e.g., based on a user input) and/or can be done automatically (e.g., based on the end user device detecting that airplane mode is no longer required based on rules associated with the vehicle including receiving an authorization signal from the vehicle).

Figure 2B:
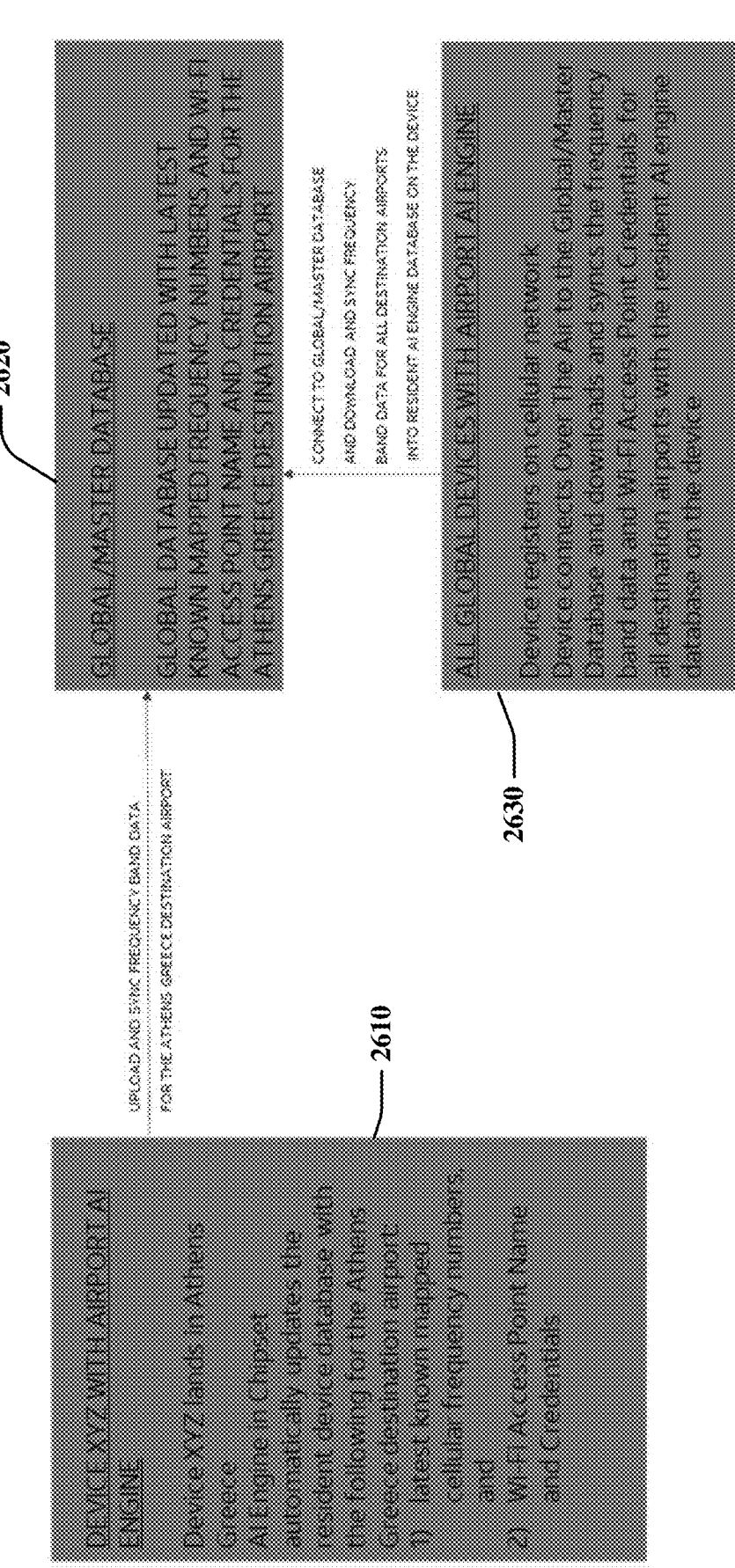
FIG. 2B depicts an illustrative embodiment of a method in accordance with various aspects described herein.

FIG. 2B depicts an illustrative embodiment of a method 260 in accordance with various aspects described herein. At 2610, an end user device can obtain (e.g., via registration/ connection to the particular networks) frequency band data (e.g., uplink and downlink frequency numbers) and Wi-Fi® APN data (e.g., APN and credentials) for a destination location where the end user device has arrived. Connection data stored in a memory of the end user device can then be revised or updated according to the frequency band data and the Wi-Fi® APN data.

At 2620, connection data (e.g., frequency band data and the Wi-Fi® APN data) stored in a database (e.g., in the cloud) can be updated based on an upload from the end user device that has arrived at (or is otherwise operating/registering at) the particular location. At 2630, other end user devices can access the database for synchronization of their own connection data stored locally. This synchronization can include an Over-The-Air (OTA) download of frequency band data and the Wi-Fi® APN data for various locations (e.g., as they change in the database). In one embodiment, the synchronization can be periodic, such as according to a schedule. In another embodiment, the synchronization can be triggered by various events, such as a change of location of a particular end user device, a threshold level of changes at the database, registration of an end user device at a different network, and so forth.

In one embodiment, the method 260 enables or facilitates causing a propagation of the frequency band data and the Wi-Fi® APN data (or other connection data) for one or more locations to other end user devices not associated with the end user device, such as from the database and/or from an end user device arriving at a location or first learning of a change to the connection data at the location. In one embodiment, the method 260 enables or facilitates presenting a notification at a user interface of the end user device indicating the propagation to the other end user devices. In one embodiment, the method 260 enables or facilitates obtaining the frequency band data and the Wi-Fi® APN data for the destination location utilizing or otherwise applying a machine learning model.

Figure 2C:
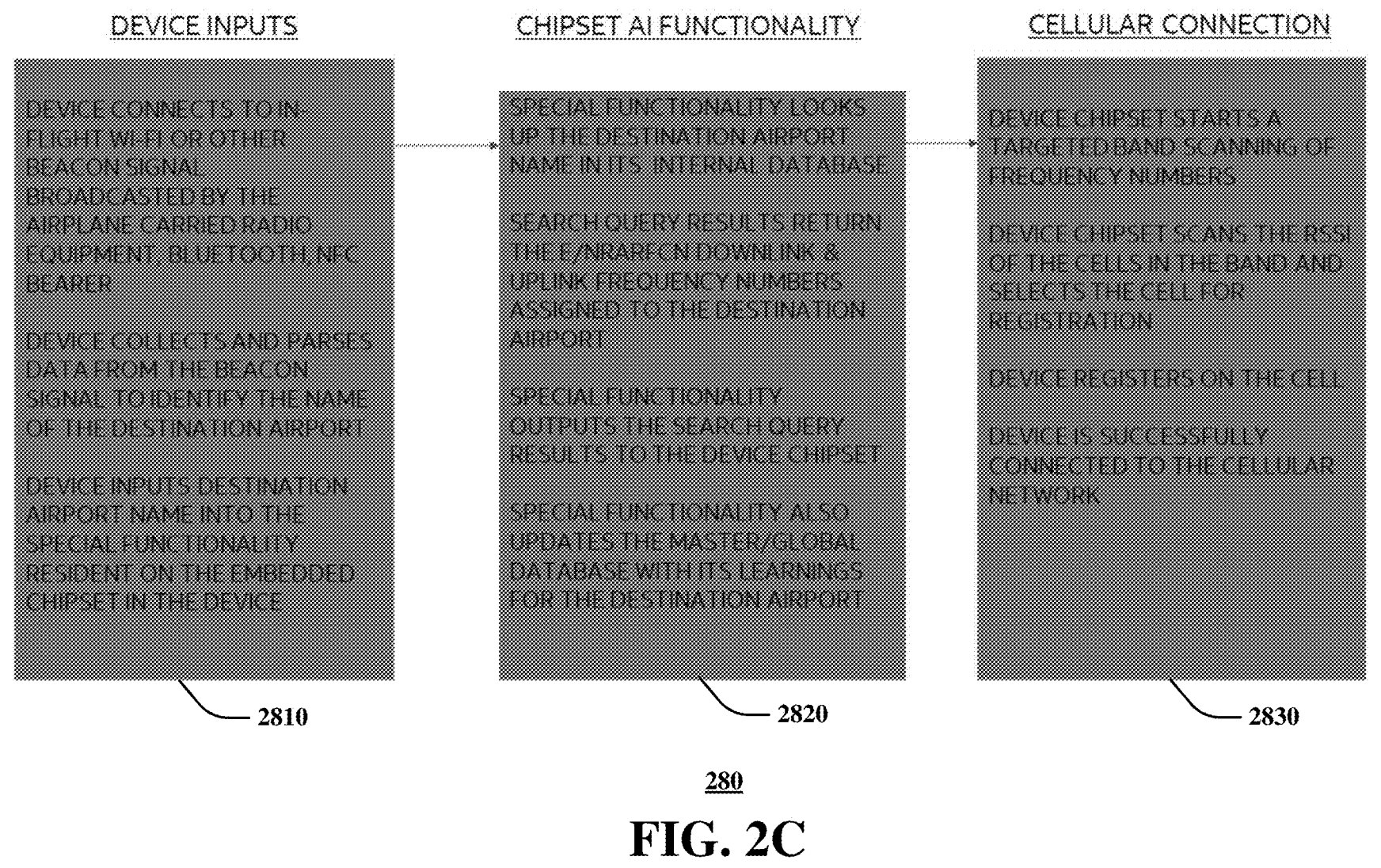

FIG. 2C depicts an illustrative embodiment of a method 280 in accordance with various aspects described herein. At 2810, an end user device can determine a destination location for itself (e.g., an intended arrival location for a vehicle that the user is travelling on). The end user device can enter an offline/airplane mode that prevents cellular and/or other RF communications (e.g., unless expressly authorized by the vehicle) and/or can provide, via an antenna of a vehicle, a short-range communication service to a user while in the offline/airplane mode. At 2820, the end user device can determine frequency band data (e.g., E/NRARFCN downlink and uplink frequency numbers assigned to the destination location) according to connection data stored in the memory that is mapped to particular locations. In one embodiment, the end user device can update a global database with any learned connection data, such as via the in-flight Wi-Fi® and/or after arrival when a connection through a cellular network is established.

At 2830, after or responsive to exiting the offline/airplane mode, the end user device can perform a targeted scanning of bands of a cellular network providing coverage to the destination location, where the scanning is according to the frequency band data. This can then result in a seamless and accelerated attaching to a cell of the cellular network based on the scanning of the bands.

In one embodiment a database/server can perform operations including receiving, from a first end user device, E/NRARFCN downlink and uplink frequency numbers for a destination location where the first end user device has arrived or has become operational (or otherwise undergoes a triggering event that causes the updating of the database); updating connection data stored in a database accessible to the processing system according to the frequency band data; and providing, via a Wi-Fi® or other short-range communication service to a second end user device, the E/NRARFCN downlink and uplink frequency numbers for the destination location, where the Wi-Fi® or other short-range communication service is provided via an antenna of a vehicle while the second end user device is in an offline/airplane mode, and where the vehicle is travelling to the destination location. In this example, the providing the E/NRARFCN downlink and uplink frequency numbers for the particular location enables the second end user device to attach to a cell of a cellular network at the destination location based on targeted scanning of bands.

Figure 2D:
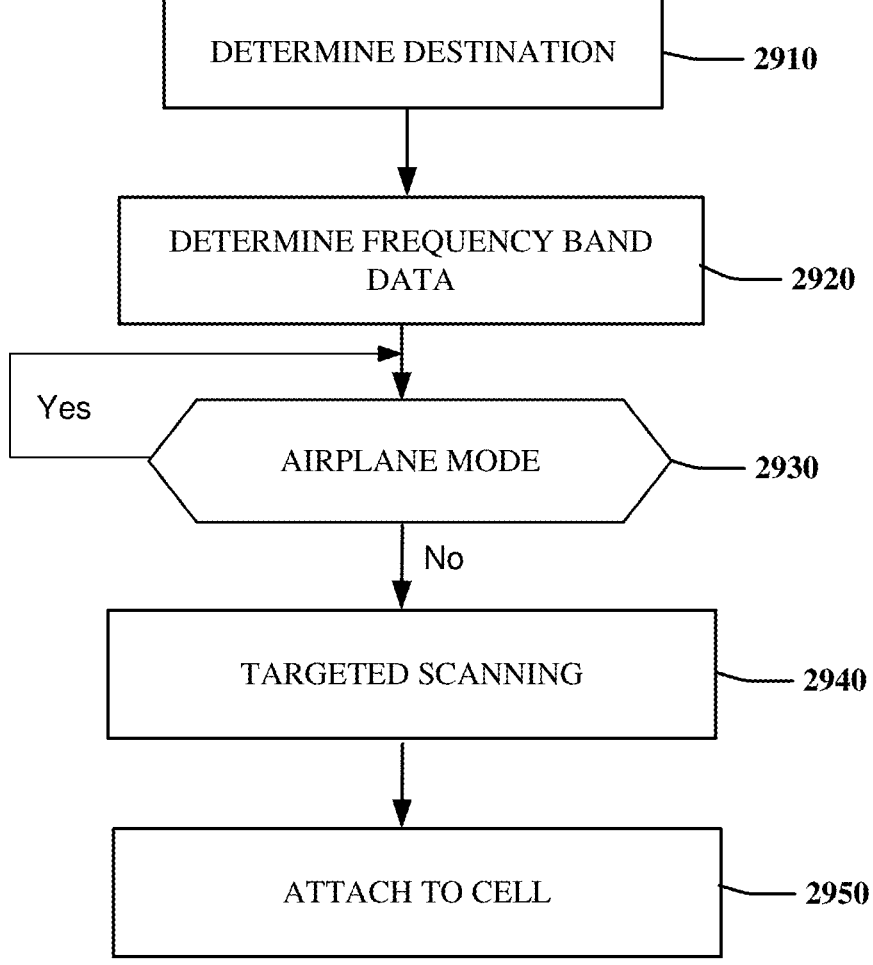
FIG. 2D depicts an illustrative embodiment of a method in accordance with various aspects described herein.

FIG. 2D depicts an illustrative embodiment of a method 290 in accordance with various aspects described herein. At 2910, an end user device can determine a destination location. For example, the end user device (e.g., smart phone, tablet, etc.) can be operating for a user in an airplane or other vehicle, and can analyze communications over the in-travel communication service (e.g., short-range communication service such as in-flight Wi-Fi® being provided by the vehicle. In one embodiment, this analysis can be of management-plane traffic, control-plane traffic and/or user-plane traffic, such as beacon frames in a Wi-Fi® service that can be analyzed to determine a destination location.

At 2920, the end user device can determine frequency band data for the destination location according to connection data stored in a memory of the end user device. For instance, the end user device can maintain a local table or local database of connection data that can include Absolute Radio Frequency Channel Number for downlink and/or uplink, Wi-Fi® APN and/or credentials, and/or other connection information, which can be mapped, indexed or otherwise associated with particular locations to facilitate making a connection at the particular location. These locations can vary and can include airports, sea ports, bus terminals, train terminals, or other locations where a user will be arriving and will desire to efficiently and expeditiously connect to a cellular and/or Wi-Fi® (or other short-range communication service), such as through a seamless, automated transition.

In one embodiment, the determination of the destination location and/or the determining the frequency band data (and/or Wi-Fi® APN and/or credentials) can occur after the end user device has entered an offline mode (e.g., airplane mode) that prevents or otherwise limits particular RF communications by the end user device, such as preventing cellular communications. In one or more embodiments, offline mode can be a limit on RF communications, such that an end user device is limited to short-range communications (e.g., in-flight Wi-Fi® services) through equipment of the vehicle (e.g., antenna, server, etc.) and is unable to engage in other wireless communications (e.g., cellular communications).

At 2930, the end user device can switch out of or otherwise exit offline/airplane mode. This can be done manually (e.g., based on a user input) and/or can be done automatically (e.g., based on the end user device detecting that airplane mode is no longer required rules associated with the vehicle including receiving an authorization signal from the vehicle.

After or responsive to exiting the offline/airplane mode at 2940, the end user device can utilize the frequency band data mapped to the particular location for establishing a cellular connection. For example, the end user device can perform a targeted scanning of particular bands of a cellular network providing coverage to the destination location, wherein the scanning is according to the frequency band data. Other functions or procedures can be performed for making the connection, including obtaining or measuring RF parameters (e.g., RSSI) for available cells of the cellular network. At 2950, the end user device can attach to a particular cell of the cellular network based on the scanning of the bands and/or other selection/connection procedures.

While for purposes of simplicity of explanation, the respective processes are shown and described as a series of blocks in FIGS. 2B, 2C and 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
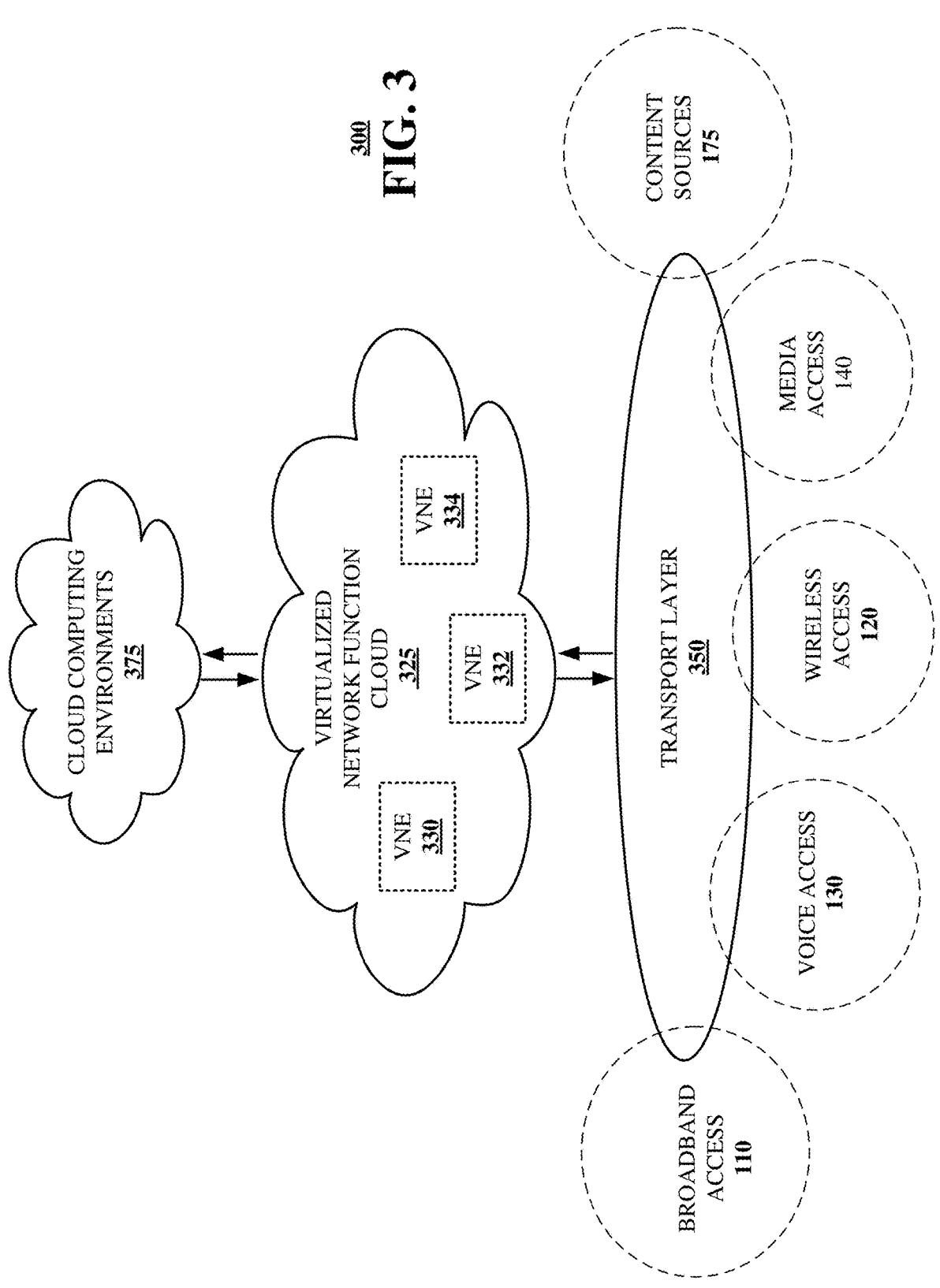
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and methods 260, 280, 290 presented in FIGS. 1, 2A, 2B, 2C, 2D and 3. For example, virtualized communication network 300 can facilitate in whole or in part determining, by an end user device, a destination location for the end user device, which can be done in a number of different ways including analyzing beacon signals of a short-range communication service (e.g., in-flight-Wi-Fi®) available to the end user device, analyzing location data available to the end user device, and so forth; determining, by the end user device, frequency band data (e.g., uplink and downlink) for the destination location according to connection data stored in a memory of the end user device (and mapped or indexed to locations), where the connection data can be managed or maintained in a number of different ways including by updating from other end user devices that are arriving at or operating in other locations, updating from a central or distributed database, and so forth; responsive to or after exiting an offline/airplane mode of the end user device, scanning, by the end user device, bands of a cellular network providing coverage to the destination location, where the scanning can be performed in a targeted fashion according to the frequency band data which can be performed faster than a general uplink and downlink scan of bands; and attaching, by the end user device, to a particular cell of the cellular network based on the scanning of the bands and/or other functions such as analyzing RSSI measurements.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
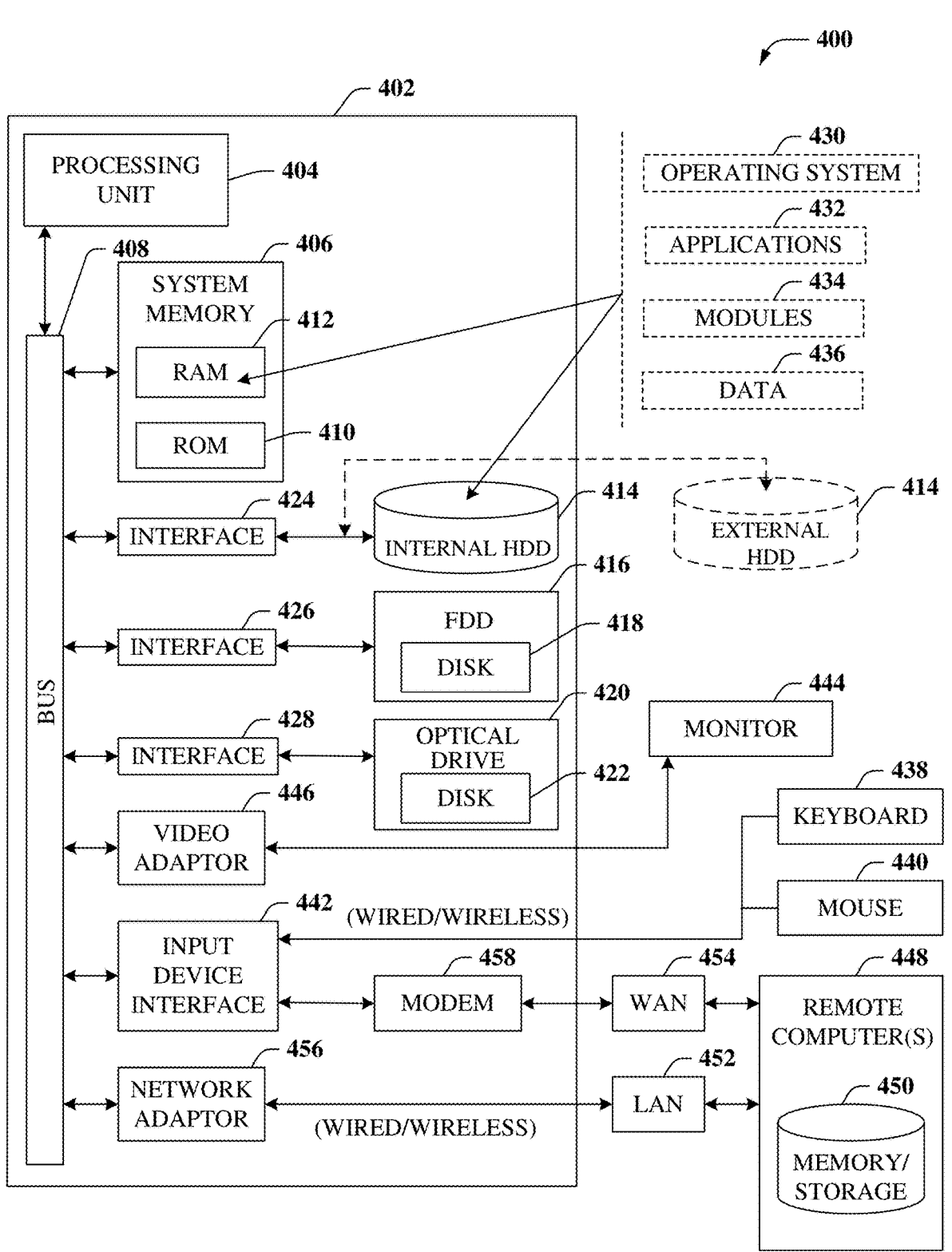
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part determining, by an end user device, a destination location for the end user device, which can be done in a number of different ways including analyzing beacon signals of a short-range communication service (e.g., in-flight Wi-Fi®) available to the end user device, analyzing location data available to the end user device, and so forth; determining, by the end user device, frequency band data (e.g., uplink and downlink) for the destination location according to connection data stored in a memory of the end user device (and mapped or indexed to locations), where the connection data can be managed or maintained in a number of different ways including by updating from other end user devices that are arriving at or operating in other locations, updating from a central or distributed database, and so forth; responsive to or after exiting an offline/airplane mode of the end user device, scanning, by the end user device, bands of a cellular network providing coverage to the destination location, where the scanning can be performed in a targeted fashion according to the frequency band data which can be performed faster than a general uplink and downlink scan of bands; and attaching, by the end user device, to a particular cell of the cellular network based on the scanning of the bands and/or other functions such as analyzing RSSI measurements.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual micropro-cessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alter-native embodiments, a monitor 444 can also be any display device (e.g., another computer having a display, a smart phone, a tablet computer, etc.) for receiving display infor-mation associated with computer 402 via any communica-tion means, including via the Internet and cloud-based networks. In addition to the monitor 444, a computer typi-cally comprises other peripheral output devices (not shown), such as speakers, printers, etc.

The computer 402 can operate in a networked environ-ment using logical connections via wired and/or wireless communications to one or more remote computers, such as a remote computer(s) 448. The remote computer(s) 448 can be a workstation, a server computer, a router, a personal computer, portable computer, microprocessor-based enter-tainment appliance, a peer device or other common network node, and typically comprises many or all of the elements described relative to the computer 402, although, for pur-poses of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the com-puter 402 can be connected to the LAN 452 through a wired and/or wireless communication network interface or adapter 456. The adapter 456 can facilitate wired or wireless com-munication to the LAN 452, which can also comprise a wireless AP disposed thereon for communicating with the adapter 456.

When used in a WAN networking environment, the com-puter 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program mod-ules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, commu-nications satellite, any piece of equipment or location asso-ciated with a wirelessly detectable tag (e.g., a kiosk, news stand, restroom), and telephone. This can comprise Wireless Fidelity (Wi-Fi®) and BLUETOOTH® wireless technolo-gies. Thus, the communication can be a predefined structure as with a conventional network or simply an ad hoc com-munication between at least two devices.

Wi-Fi® can allow connection to the Internet from a couch at home, a bed in a hotel room or a conference room at work, without wires. Wi-Fi® is a wireless technology similar to that used in a cell phone that enables such devices, e.g., computers, to send and receive data indoors and out; anywhere within the range of a base station. Wi-Fi® networks use radio technologies called IEEE 802.11 (a, b, g, n, ac, ag, etc.) to provide secure, reliable, fast wireless connectivity. A Wi-Fi® network can be used to connect computers to each other, to the Internet, and to wired networks (which can use IEEE 802.3 or Ethernet). Wi-Fi® networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
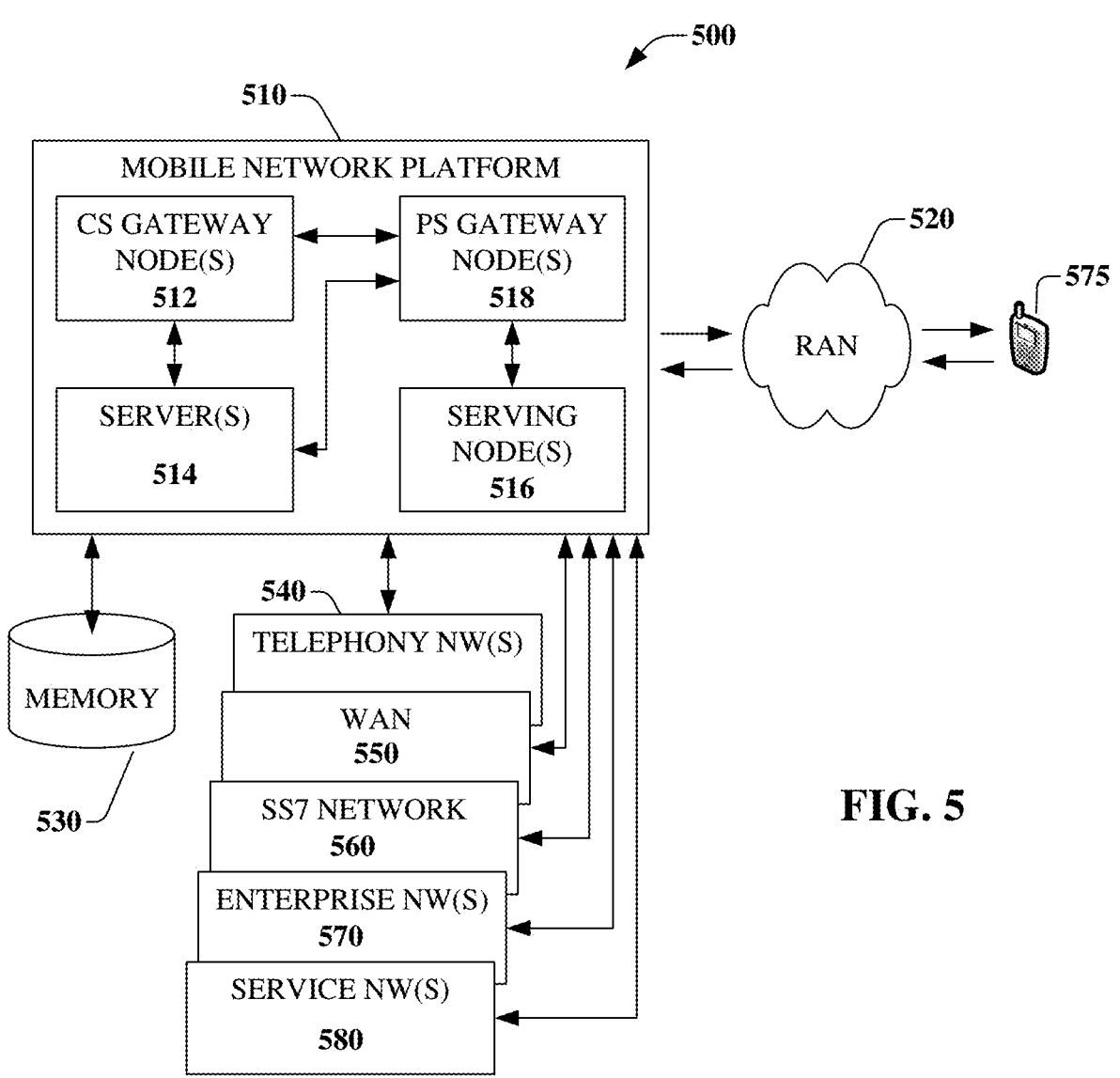
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part determining, by an end user device, a destination location for the end user device, which can be done in a number of different ways including analyzing beacon signals of a short-range communication service (e.g., in-flight Wi-Fi®) available to the end user device, analyzing location data available to the end user device, and so forth; determining, by the end user device, frequency band data (e.g., uplink and downlink) for the destination location according to connection data stored in a memory of the end user device (and mapped or indexed to locations), where the connection data can be managed or maintained in a number of different ways including by updating from other end user devices that are arriving at or operating in other locations, updating from a central or distributed database, and so forth; responsive to or after exiting an offline/airplane mode of the end user device, scanning, by the end user device, bands of a cellular network providing coverage to the destination location, where the scanning can be performed in a targeted fashion according to the frequency band data which can be performed faster than a general uplink and downlink scan of bands; and attaching, by the end user device, to a particular cell of the cellular network based on the scanning of the bands and/or other functions such as analyzing RSSI measurements.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CSbased traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi® networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
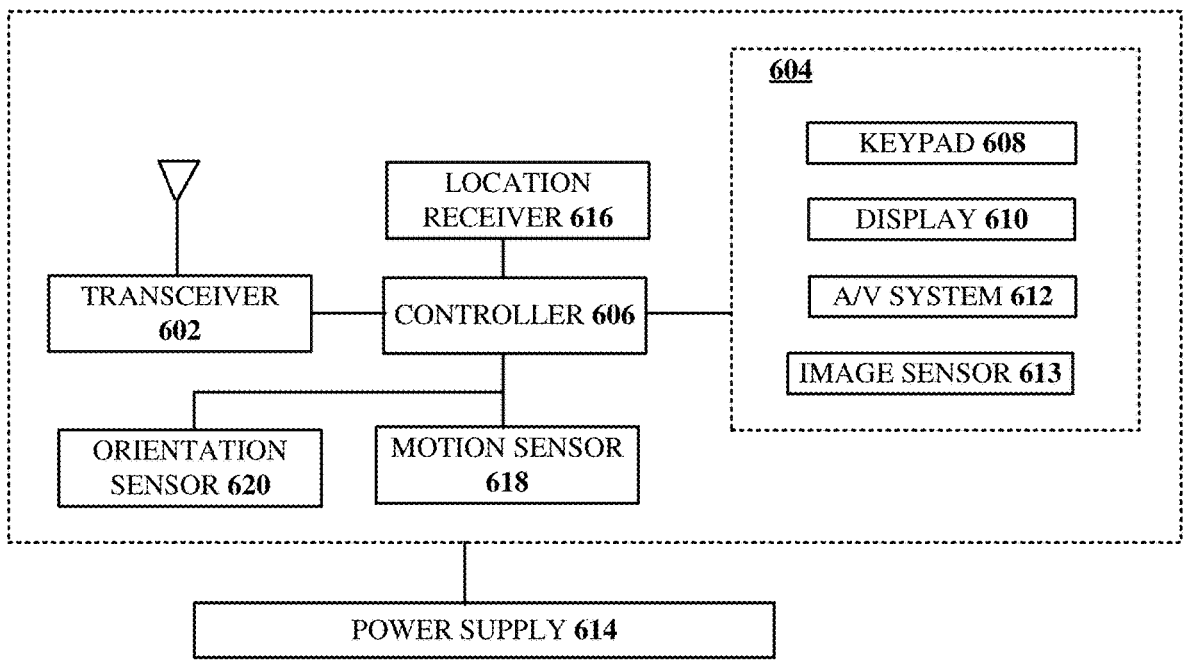
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part determining, by an end user device, a destination location for the end user device, which can be done in a number of different ways including analyzing beacon signals of a short-range communication service (e.g., in-flight Wi-Fi® available to the end user device, analyzing location data available to the end user device, and so forth; determining, by the end user device, frequency band data (e.g., uplink and downlink) for the destination location according to connection data stored in a memory of the end user device (and mapped or indexed to locations), where the connection data can be managed or maintained in a number of different ways including by updating from other end user devices that are arriving at or operating in other locations, updating from a central or distributed database, and so forth; responsive to or after exiting an offline/airplane mode of the end user device, scanning, by the end user device, bands of a cellular network providing coverage to the destination location, where the scanning can be performed in a targeted fashion according to the frequency band data which can be performed faster than a general uplink and downlink scan of bands; and attaching, by the end user device, to a particular cell of the cellular network based on the scanning of the bands and/or other functions such as analyzing RSSI measurements.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi®, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi®, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. An end user device comprising:
   a processing system including a processor; and
   a memory that stores executable instructions that, when executed by the processing system, facilitate performance of operations, the operations comprising:
   entering an offline mode that prevents cellular communications;
   receiving, from an antenna of a vehicle, a short-range communication service while in the offline mode;
   determining a destination location for the vehicle;
   determining frequency band data for the destination location according to connection data stored in the memory;
   exiting the offline mode;
   responsive to the exiting the offline mode, scanning bands of a cellular network providing coverage to the destination location, wherein the scanning is according to the frequency band data; and
   attaching to a cell of the cellular network based on the scanning of the bands.

2. The end user device of claim 1, wherein the short-range communication service is a Wi-Fi® service provided by the vehicle, wherein the vehicle is an airplane, wherein the offline mode is airplane mode, and wherein the determining the destination location is based on analyzing location information communicated over the Wi-Fi® service.

3. The end user device of claim 2, wherein the location information is in a beacon signal of the Wi-Fi® service.

4. The end user device of claim 1, wherein the operations further comprise:
   obtaining, via the short-range communication service from a database, updated frequency band data for one or more locations; and
   revising the connection data stored in the memory according to the updated frequency band data.

5. The end user device of claim 1, wherein the operations further comprise:
   responsive to the exiting the offline mode, scanning RSSI for a group of cells of the cellular network according to the frequency band data; and
   selecting the cell of the cellular network for attachment based on the scanning of the RSSI.

6. The end user device of claim 1, wherein the exiting the offline mode is performed automatically without receiving user input.

7. The end user device of claim 1, wherein the frequency band data comprises Absolute Radio Frequency Channel Number (ARFCN) downlink and uplink.

8. The end user device of claim 1, wherein the operations further comprise:
   parsing information received via the short-range communication service while in the offline mode, wherein the determining the destination location for the vehicle is according to the parsing of the information.

9. The end user device of claim 1, wherein the operations further comprise:

determining Wi-Fi® Access Point Name (APN) and credentials for the destination location according to the connection data stored in the memory; and responsive to the exiting the offline mode, connecting to an access point of a Wi-Fi® network based on the Wi-Fi® APN and credentials for the destination location.

10. The end user device of claim 1, wherein the operations further comprise:

determining whether a data connection is persistent; and responsive to determining that the data connection is not persistent, performing a troubleshooting sequence for the data connection.

11. The end user device of claim 1, wherein the operations further comprise:

after exiting the offline mode, obtaining updated frequency band data for the destination location;

revising the connection data stored in the memory according to the updated frequency band data; and providing the updated frequency band data to a database that is accessible to other end user devices not associated with the end user device.

12. The end user device of claim 1, wherein the determining the destination location utilizes a machine learning model.

13. A method comprising:

entering, by a processing system including a processor, an offline mode that prevents cellular communications;

receiving, by the processing system from an antenna of a vehicle, a short-range communication service to a user while in the offline mode;

determining, by the processing system, a destination location for the vehicle;

determining, by the processing system, frequency band data for the destination location according to connection data stored in a memory;

exiting, by the processing system, the offline mode;

responsive to the exiting the offline mode, scanning, by the processing system, bands of a cellular network providing coverage to the destination location, wherein the scanning is according to the frequency band data; and attaching, by the processing system, to a cell of the cellular network based on the scanning of the bands.

14. The method of claim 13, wherein the short-range communication service is a Wi-Fi® service provided by the vehicle, wherein the vehicle is an airplane, wherein the offline mode is airplane mode, and wherein the determining the destination location is based on analyzing location information communicated over the Wi-Fi® service.

15. The method of claim 13, further comprising:

obtaining, by the processing system via the short-range communication service from a database, updated frequency band data for one or more locations; and revising, by the processing system, the connection data stored in the memory according to the updated frequency band data.

16. The method of claim 13, further comprising:

responsive to the exiting the offline mode, scanning, by the processing system, RSSI for a group of cells of the cellular network according to the frequency band data; and selecting, by the processing system, the cell of the cellular network for attachment based on the scanning of the RSSI.

17. The method of claim 13, wherein the exiting the offline mode is performed automatically without receiving user input.

18. The method of claim 13, further comprising:

after exiting the offline mode, obtaining updated frequency band data for the destination location;

revising the connection data stored in the memory according to the updated frequency band data; and providing the updated frequency band data to a database that is accessible to other end user devices not associated with the end user device.

19. The method of claim 13, wherein the determining the destination location utilizes a machine learning model.

20. A non-transitory machine-readable medium, comprising executable instructions that, when executed by a processing system including a processor of an end user device, facilitate performance of operations, the operations comprising:

entering an offline mode that prevents cellular communications;

receiving, from an antenna of a vehicle, a short-range communication service to a user while in the offline mode;

determining a destination location for the vehicle;

determining frequency band data for the destination location according to connection data stored in a memory;

exiting the offline mode;

responsive to the exiting the offline mode, scanning bands of a cellular network providing coverage to the destination location, wherein the scanning is according to the frequency band data; and attaching to a cell of the cellular network based on the scanning of the bands.

* * * * *